US010610835B2

(12) United States Patent
Dahms et al.

(10) Patent No.: US 10,610,835 B2
(45) Date of Patent: Apr. 7, 2020

(54) EMULSIFICATION DEVICE FOR CONTINUOUSLY PRODUCING EMULSIONS AND/OR DISPERSIONS

(71) Applicant: Clariant International AG, Muttenz (CH)

(72) Inventors: Gerd Dahms, Duisburg (DE); Andreas Jung, Duisburg (DE); Jan Hendrik Dörr, Wülfrath (DE)

(73) Assignee: CLARIANT INTERNATIONAL AG, Muttenz (CH)

( * ) Notice: Subject to any disclaimer, the term of this patent is extended or adjusted under 35 U.S.C. 154(b) by 0 days.

(21) Appl. No.: 15/407,609

(22) Filed: Jan. 17, 2017

(65) Prior Publication Data

US 2017/0120205 A1 May 4, 2017

Related U.S. Application Data

(63) Continuation of application No. 13/696,420, filed as application No. PCT/EP2011/057315 on May 6, 2011, now Pat. No. 9,555,380.

(30) Foreign Application Priority Data

May 7, 2010 (DE) ........................ 10 2010 028 774

(51) Int. Cl.
*B01F 7/00* (2006.01)
*B01F 3/08* (2006.01)
(Continued)

(52) U.S. Cl.
CPC ........ *B01F 3/0807* (2013.01); *B01F 7/00116* (2013.01); *B01F 7/00141* (2013.01);
(Continued)

(58) Field of Classification Search
CPC .. B01F 15/0201; B01F 13/002; B01F 3/0807; B01F 7/00116; B01F 7/00141;
(Continued)

(56) References Cited

U.S. PATENT DOCUMENTS 2,667,407 A * 1/1954 Fenske .................... B01D 3/30 196/14.52
3,579,461 A 5/1971 Glaub
(Continued)

FOREIGN PATENT DOCUMENTS

CA 2088217 7/1993
CN 1070916 4/1993
(Continued)

OTHER PUBLICATIONS

International Search Report for PCT/EP2011/057315, dated Aug. 9, 2011.
(Continued)

*Primary Examiner* — Anshu Bhatia
(74) *Attorney, Agent, or Firm* — Tod A. Waldrop

(57) ABSTRACT

The invention relates to an emulsification device for continuously producing emulsions, nano-emulsions, and/or dispersions having a liquid crystalline structure, comprising a) at least one mixing system, b) at least one drive for the stirring element, and c) at least one delivery unit for each component or each component mixture.

13 Claims, 8 Drawing Sheets

Figure 1:
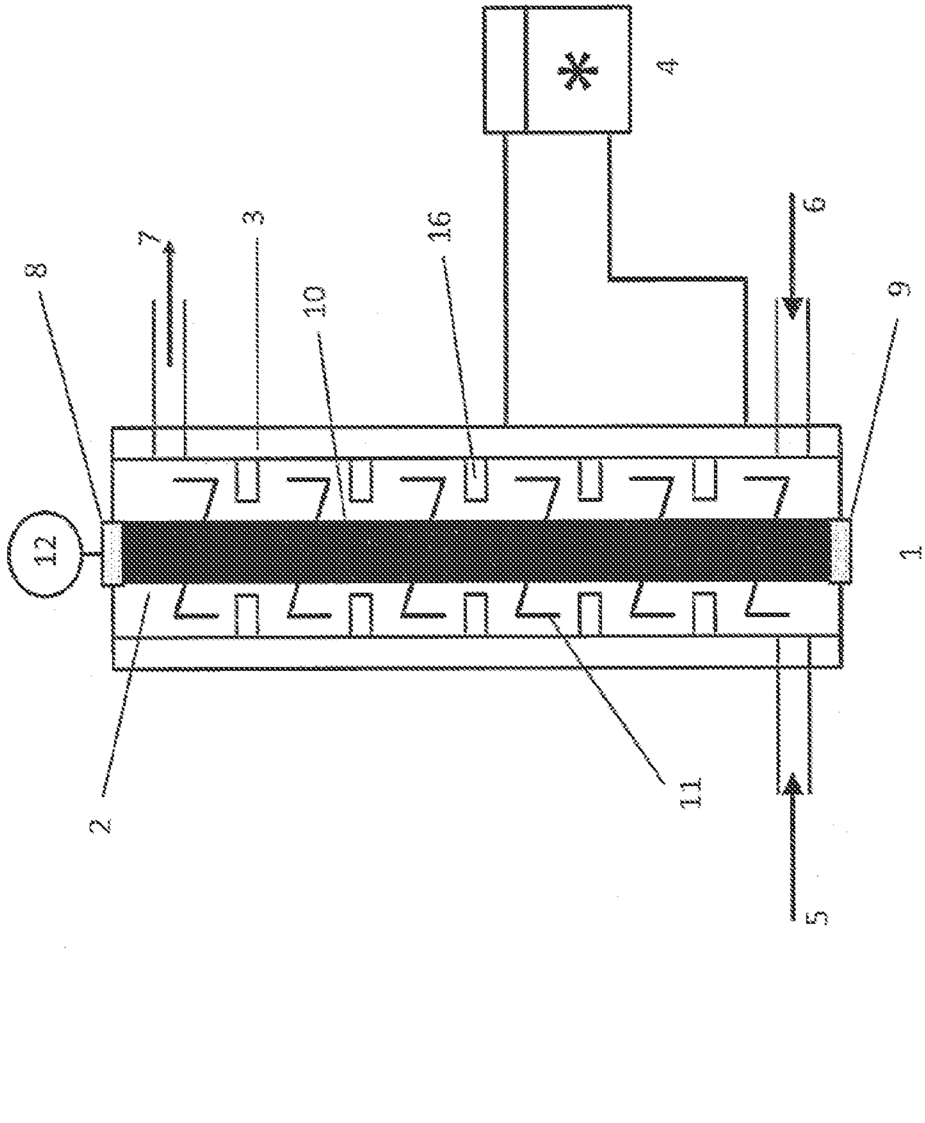

(51) Int. Cl.

| | |
|---|---|
| ***B01F 7/18*** | (2006.01) |
| ***B01F 13/08*** | (2006.01) |
| ***B01F 13/10*** | (2006.01) |
| ***B01F 15/00*** | (2006.01) |
| ***B01F 15/06*** | (2006.01) |

(52) U.S. Cl.

CPC ...... *B01F 7/00583* (2013.01); *B01F 7/00633* (2013.01); *B01F 7/00908* (2013.01); *B01F 7/183* (2013.01); *B01F 13/0836* (2013.01); *B01F 13/1016* (2013.01); *B01F 15/00707* (2013.01); *B01F 15/00824* (2013.01); *B01F 15/065* (2013.01); *B01F 2215/005* (2013.01); *B01F 2215/0014* (2013.01); *B01F 2215/0031* (2013.01); *B01F 2215/0032* (2013.01); *B01F 2215/045* (2013.01); *B01F 2215/0431* (2013.01); *B01F 2215/0472* (2013.01); *B01F 2215/0495* (2013.01)

(58) Field of Classification Search

CPC .............. B01F 7/00583; B01F 7/00633; B01F 7/00908; B01F 7/183; B01F 13/0836; B01F 13/1016; B01F 15/00707; B01F 15/00824; B01F 15/065; B01F 2215/0014; B01F 2215/0031; B01F 2215/0032; B01F 2215/005; B01F 2215/0431; B01F 2215/045; B01F 2215/0472; B01F 2215/0495

USPC .................................. 366/172.1, 174.1, 142

See application file for complete search history.

(56) References Cited

U.S. PATENT DOCUMENTS

| | | | |
|---|---|---|---|
| 3,807,703 | A | 4/1974 | Day |
| 4,123,403 | A | 10/1978 | Warner et al. |
| 4,155,657 | A | 5/1979 | King et al. |
| 4,539,139 | A | 9/1985 | Ichikawa et al. |
| 5,149,720 | A | 9/1992 | DesMarais et al. |
| 5,250,576 | A | 10/1993 | DesMarais et al. |
| 5,938,581 | A | 10/1999 | Bibette et al. |
| 7,122,161 | B1 | 10/2006 | Moritz et al. |
| 7,230,037 | B2 | 6/2007 | Sulzbach et al. |
| 7,775,704 | B2 | 8/2010 | Dahms et al. |
| 7,942,572 | B2 | 5/2011 | Arletti et al. |
| 2003/0227817 | A1* | 12/2003 | Martel ............... B01D 19/0063 366/142 |

FOREIGN PATENT DOCUMENTS

| | | |
|---|---|---|
| CN | 1095965 | 12/1994 |
| CN | 1170728 | 1/1998 |
| CN | 2629819 | 8/2004 |
| DE | 1757217 | 2/1972 |
| DE | 2357212 | 5/1975 |
| DE | 2720683 | 11/1978 |
| DE | 19828742 | 12/1999 |
| EP | 0553620 | 8/1993 |
| EP | 1606044 | 9/2006 |
| EP | 1964604 | 9/2008 |
| JP | S57187626 | 11/1982 |
| JP | H0747253 | 2/1995 |
| JP | 2007508133 | 4/2007 |
| JP | 2009154121 | 7/2009 |
| JP | 2010077114 | 4/2010 |
| KR | 20070104372 | 10/2007 |
| WO | 2004082817 | 9/2004 |

OTHER PUBLICATIONS

International Preliminary Report on Patentability for PCT/EP2011/0057315, dated Nov. 13, 2012.

Catalog entry for IKA® T-25 Digital High-Speed Homogenizer Systems, 3 pages, 2008.

Vaessen, G.E.J., et al., "Predicting Catastrophic Phase Inversion on the Basis of Droplet Coalescence Kinetics", *Langmuir*, 1996, vol. 12, pp. 875-882.

Definition of "Kavitation" from Fachlexikon ABC Physik, Ed. Richard Lenk, et al., p. 452, 1989.

Dissertation: "Development of reactors for continuous emulsion polymerization as an alternative to the flow stirred tank and the flow stirred tank cascade", Wolfgang Schmidt, Wissenschaft und Technik Verlag, Jul. 1998.

Stein, H. N., "The Preparation of Dispersions in Liquids" Surfactant Science Series, vol. 58, pp. iii-viii, 92-99, 178-181, 1995.

* cited by examiner

EMULSIFICATION DEVICE FOR CONTINUOUSLY PRODUCING EMULSIONS AND/OR DISPERSIONS

The present invention relates to an emulsifying device for continuous production of emulsions and/or dispersions. The emulsifying device according to the invention can be employed both for the production of conventional classical two-phase emulsions, multiphase emulsions, such as, for example, multiple emulsions and dispersions as well as of three-phase emulsions (OW), which in addition to the disperse oil phase also contain a liquid crystalline gel network phase, but also for the production of liquid-crystalline pearlescent agents, liquid-crystalline self-organizing systems (gel network phases in OW emulsions) such as, for example, hair conditioning agents, and also skin and hair cleansing agents such as shampoos, shower gels, wax and silicone emulsions and perfluoroether emulsions etc. The emulsifying device according to the invention can be employed in the polishing and cleaning agent industry, the cosmetic industry, pharmacy, dye industry and paint and varnish industry but also in the food industry.

From the prior art, apparatuses are known for the production of emulsions and/or dispersions, which are usually used for carrying out batchwise processes.

WO 2004/082817 A1 discloses an apparatus for the continuous production of emulsions or dispersions with exclusion of air, which comprises a mixing apparatus sealed on all sides, which has supply and removal pipes for the introduction and discharge of fluid substances or substance mixtures, and also a stirrer unit, which allows a stirred introduction into the emulsion or dispersion without production of cavitation forces and without high-pressure homogenization.

EP 1 964 604 A2 discloses an apparatus and a process for the continuous production of a mixture of at least two fluid phases using a mixing vessel sealed on all sides, and rotationally symmetric around its longitudinal axis, at least two inlet lines leading into the mixing vessel for the introduction in each case of a fluid phase of at least one outlet line leading from the mixing vessel for the discharging of a mixture mixed from these phases and a rotatable stirrer with vanes for stirring the phases, the axis of rotation of which is in the longitudinal axis of the mixing vessel. Using the apparatus according to EP 1 964 604 A2, a controlled elongational flow cannot be produced and measures are not taken for preventing turbulence and cavitation forces.

It is the object of the present invention, to provide an emulsifying device, with the aid of which a continuous production of emulsions, nanoemulsions and/or dispersions with liquid-crystalline structure is made possible.

According to the invention, the object is achieved by an emulsifying device for continuous production of emulsions and/or dispersions comprising a) at least one mixing apparatus comprising
- a rotationally symmetric chamber sealed airtight on all sides,
- at least one inlet line for introduction of free-flowing components,
- at least one outlet line for discharge of the mixed free-flowing components,
- a stirrer unit which ensures laminar flow and comprises stirring elements secured on a stirrer shaft, the axis of rotation of which runs along the axis of symmetry of the chamber and the stirrer shaft of which is guided on at least one side, wherein the at least one inlet line is arranged upstream of or below the at least one outlet line, wherein the ratio between the distance between inlet and outlet lines and the diameter of the chamber is ≥2:1, wherein the ratio between the distance between inlet and outlet lines and the length of a stirrer arm of the stirrer elements is 3:1 to 50:1, and wherein the ratio of the diameter of the stirrer shaft, based on the internal diameter of the chamber, is 0.25 to 0.75 times the diameter of the chamber, such that the components introduced into the mixing apparatus via the at least one inlet line are stirred and continuously transported by means of
- a turbulent mixing area on the inlet side, in which the components are mixed turbulently by the shear forces exerted by the stirrer units,
- a downstream percolating mixing area in which the components are mixed further and the turbulent flow decreases,
- a laminar mixing area on the outlet side, in which a lyotropic, liquid-crystalline phase is established in the mixture of the components, in the direction of the outlet line, b) at least one drive for the stirrer unit and c) at least one conveying device per component or per component mixture.

The percolating mixing area is the transition area of the mixture, in which this changes from turbulent flow to laminar flow. In the percolating area following the turbulent mixing the viscosity increases, caused either by constant comminution of the droplets or by formation of liquid-crystalline phases, and the turbulent flow decreases. After reaching the critical Reynolds number, the mixture passes into a laminar mixing area. Controlled and energy-efficient severing of the drops during the mixing process or the formation of liquid-crystalline phases then occurs in the laminar mixing area under conditions of elongational flow.

The chamber of the at least one mixing apparatus is rotationally symmetric and preferably has the shape of a hollow cylinder. The chamber, however, can also have the shape of a frustocone, of a funnel, of a frustodome, or a shape composed of these geometric shapes, wherein the diameter of the chamber from the inlet line to the outlet line remains constant or decreases. The stirrer unit is adapted according to the shape of the rotationally symmetric chamber.

The diameter of the stirrer shaft $d_{SS}$ relative to the internal diameter of the chamber $d_k$ is preferably in the range $0.25\text{-}0.75 \times d_k$ and the ratio between the distance between inlet and outlet lines and the length of the arms of the stirrer elements is preferably in the range 3:1-50:1, particularly preferably in the range 5:1-10:1, in particular in the range 6:1-8:1. The unusually large diameter of the stirrer shaft in relation to the chamber diameter furthermore has the result that the distance between stirrer shaft and chamber wall—designated by the person skilled in the art as the "flow diameter"—is always so small that no thrombi-like flow can develop and a laminar flow is ensured.

The ratio of the distance between inlet and outlet line to the diameter of the chamber at the bottom of the at least one mixing apparatus is ≥2:1. In one form of the rotationally symmetric chamber deviating from a hollow cylinder, the ratio of distance between inlet and outlet lines to the diameter of the chamber is likewise ≥2:1 in the area of the inlet line of the at least one mixing apparatus.

The mixing apparatus is sealed on all sides and is operated with exclusion of air. The components to be mixed are introduced into the chamber of the mixing apparatus as fluid streams, mixed by means of the stirrer unit until the mixed components reach the outlet line and are removed such that no air penetrates into the chamber of the mixing apparatus. The mixing apparatus is designed here such that as little dead space as possible is present. In the putting into operation of the mixing apparatus, the air contained therein is displaced completely by the entering components within a short time, whereby the application of a vacuum is advantageously unnecessary.

Since the system operates with exclusion of air and the components to be emulsified are introduced into the mixing apparatus continuously, the components situated in the mixing apparatus are continuously transported away in the direction of the outlet line. The mixed components flow through the mixing apparatus gradually starting from the inlet to the outlet.

In the mixing apparatus according to the invention, the components supplied via the inlet lines firstly migrate after entry into the chamber through a turbulent mixing area, in which they are first mixed turbulently by the shear forces exerted by the stirrer units. In this connection, the viscosity of the mixed product already noticeably increases. Further in the direction of the outlet line, the mixture then migrates through a "percolating area", in which the viscosity of the mixture further increases due to further intensive mixing and the system gradually converts into a self-organizing system. The turbulences in the flow prevailing in the mixture gradually decrease with reaching of the percolating area, and the flow ratios become increasingly laminar in the direction of the outlet lines. A lyotropic, liquid-crystalline phase thereby results in the mixture to the outlet line.

Advantageously, the total energy consumption of the emulsifying device according to the invention is extremely low. This low total energy consumption results from always only small volumes having to be mixed and temperature-controlled in the mixing apparatuses in comparison to conventional mixing processes. In particular, cost-intensive and very energy-consuming heating and cooling processes are thus minimized and contribute decisively to the low total energy consumption. The residence times of the mixture in the mixing chamber are also very short. With a production capacity of 1000 kg/h, the residence time is on average between 0.5 and 10 seconds. It results from this that the inlet lines and pumps are also of significantly smaller dimensions and thus also the drives of the pumps take up significantly less energy.

Advantageously, the favorable ratio between the distance between inlet and outlet lines and the length of the arms of the stirrer elements, which is preferably in the range 3:1-50:1, particularly preferably in the range 5:1-10:1, in particular in the range 6:1-8:1, contributes, in connection with the special wire pipes, to the fact that a particularly effective torque moment utilization is guaranteed and thus thorough mixing with minimized energy consumption of the motor at the same time is achieved.

Furthermore, the unusually large shaft diameter in relation to the chamber diameter makes it possible that the stirrer shaft itself can be utilized for product temperature control, which for its part contributes to the low total energy consumption of the emulsifying device according to the invention.

As a result of the favorable ratio of diameter of the chamber to its height and the stirrer unit optimized for the maintenance of laminar flow, the power uptake of the stirrer motor is significantly lower and contributes decisively to the low total energy consumption of the apparatus according to the invention. As a result of the thus, overall, smaller dimensionable components, a very compact and space-saving construction is characteristic of the mixing apparatus according to the invention.

The use of magnetic couplings likewise contributes to the lowering of the overall energy consumption. Since the transfer of force here from the motor to the motor shaft takes place by means of permanent magnets, the motor only has to apply the energy which is needed for rotation of the external rotor. The internal rotor with a fixed stirrer shaft is moved by means of the magnetic force. A further advantage in connection with a plain bearing is that a hermetically sealed mixing chamber can be constructed.

Figure 2:
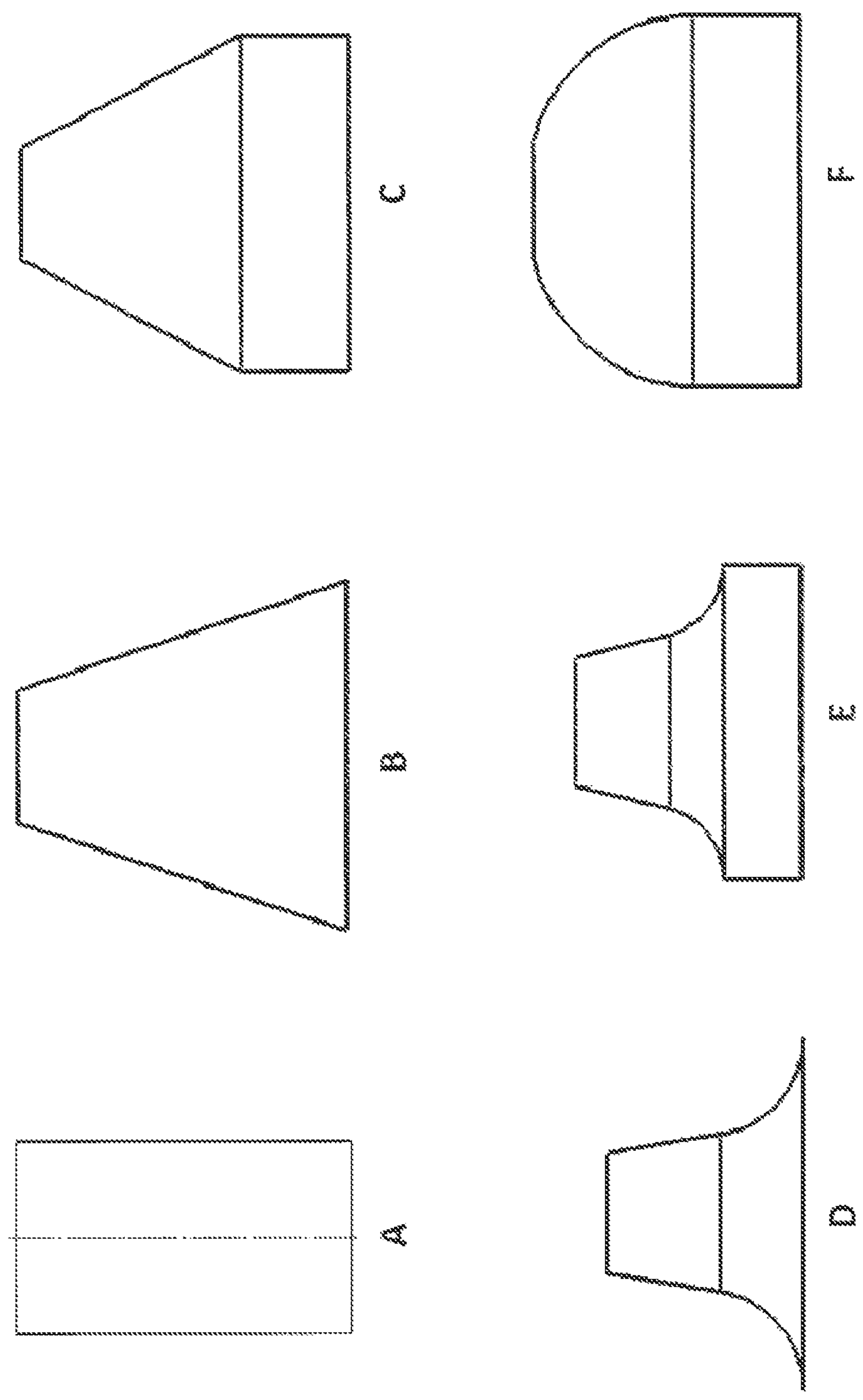

For an optimal emulsifying result and for the avoidance of dead spaces, chambers that have a rotationally symmetric shape are employed in the mixing apparatuses according to the invention. Such rotationally symmetric shapes are preferably hollow cylinders (FIG. 2 A), but also a frustocone (FIG. 2 B), funnel (FIG. 2 D), frustodome (FIG. 2 F), or shapes composed of these (FIG. 2 C, E), in which, for example, a frustocone-like area connects to a hollow cylindrical area. The diameter of the mixing apparatus in this connection either remains constant from the inlet-side end to the outlet-side end (FIG. 2 A) or it decreases (FIG. 2 B-F).

Particularly preferably, a chamber with the shape of a hollow cylinder or of a frustocone or with a combined shape of a hollow cylindrical area and a frustocone-like area is employed in the mixing apparatus according to the invention. The frustocone is advantageously distinguished in that the diameter of the inlet-side end to the diameter on the outlet-side end continually decreases, while the diameter of the hollow cylinder with respect to the axis of rotation is constant.

Advantageously, the chambers of the mixing apparatus and/or the inlet and outlet lines can be temperature-controlled together or individually.

The supply of components to the mixing apparatus takes place by means of at least one inlet line, which is adapted in diameter to the respective component and its viscosity and guarantees complete filling with the respective phase. Preferably, the mixing apparatus according to the invention has at least two inlet lines. In the case where pre-mixing is to be carried out in the mixing apparatus, the mixing apparatus, however, can also have only one inlet line. The components to be emulsified or to be dispersed can also be introduced into a common inlet line, for example, by means of a Y-shaped connection before they reach the mixing apparatus. Static pre-mixers or passive mixing apparatuses known to the person skilled in the art can optionally be situated in this common inlet line. Component within the meaning of the invention can be a pure substance, but also a mixture of various substances.

The angle of entry of the inlet lines into the mixing apparatus can in this connection be in the range from 0° to 180°, based on the axis of rotation of the mixing apparatus. The inlet lines can extend into the chamber laterally through the jacket surface or from below through the bottom surface.

The inlet and outlet lines can be connected to the chamber at any desired height and on any desired circumference of the jacket surface. To guarantee optimal mixing with, at the same time, maximum residence time of the components supplied, and to avoid dead spaces, the entry height of the inlet line(s) is preferably situated in the lower third, preferably in the lower quarter, of the chamber, based on the height of the chamber. The exit height of the outlet line is preferably situated in the upper third, preferably in the upper quarter, of the chamber, based on the height of the chamber.

The diameter of the outlet line is dimensioned such that the pressure buildup based on the high viscosity in the at least one or first mixing apparatus is minimized, but at the same time it is ensured that the outlet lines are in each case completely filled with the mixture.

Some products, such as, for example, three-phase OW emulsions, liquid-crystalline pearlescent agents, and lyotropic liquid-crystalline phases of self-organizing systems, can require the additional delayed addition of components to the percolating area of the first mixing apparatus, which is situated above the entry height of the inlet lines and below the height of the outlet lines. Therefore additional entry lines can be situated in this area.

The mixing apparatus can be oriented as desired, such that the axis of rotation of the stirrer unit can assume any desired position from horizontal to vertical. Preferably, however, the mixing apparatus is not arranged such that the axis of symmetry of the chamber is arranged vertically and the inlet lines are attached here above the outlet lines. Very particularly preferably, the mixing apparatus is arranged such that the axis of symmetry of the chamber is arranged vertically and the inlet lines are attached here below the outlet lines. The drive motor in this connection drives the stirrer unit preferably from above, likewise a drive from below, however, is possible.

Surprisingly, it has turned out that with the geometry of the mixing apparatus, the diameter of the stirrer shaft $d_{SS}$ relative to the internal diameter of the chamber $d_k$ and the ratio between the distance between inlet and outlet line and the length of the arms of the stirrer elements is decisive to ensure an optimal mixing of the supplied phases. In this connection, it has turned out that the ratio of the diameter of the stirrer shaft $d_{SS}$ based on the internal diameter of the chamber $d_k$ is preferably in the range 0.25-0.75×$d_k$, particularly preferably in the range from 0.3-0.7×$d_k$, in particular in the range from 0.4-0.6×$d_k$, and the ratio between the distance between the inlet and outlet line and length of the arms of the stirrer elements is preferably in the range 3:1-50:1, particularly preferably in the range 5:1-10:1, in particular in the range 6:1-8:1.

This unusually large diameter of the stirrer shaft with respect to the chamber diameter furthermore results in the distance between stirrer shaft and chamber wall—also designated by the person skilled in the art as the "flow diameter"—always being so small that no thrombi-like flow can develop and a laminar flow is guaranteed.

It has furthermore turned out that with the geometry of the mixing apparatus, the ratio between the diameter of the chamber of the mixing apparatus and the distance which the components to be mixed must migrate through from the inlet to the outlet is crucial to guarantee an optimal mixing of the phases supplied. It has turned out in this connection that the ratio of diameter to the distance between inlet and outlet is preferably in the range 1:50 to 1:2, preferably from 1:30 to 1:3, in particular in the range from 1:15 to 1:5. Diameter of the chamber within the meaning of the invention is the diameter at the bottom of the chamber.

The ratio of diameter to the distance from inlet and outlet plays a crucial role for the control of the flow within the mixing apparatus. The success of emulsification is guaranteed only if the mixture comes into the laminar area from the initially turbulent flow which is present in the lower area of the mixing apparatus, that is in the area of component supply, via the "percolating area". An exact delimitation of the individual areas is not possible here, since the transition between the respective areas is fluid.

Since different amounts of time are needed for the formation of the lyotropic liquid-crystalline phase, depending on the components, the mixing apparatus length can be adapted depending on the product. The formation of self-organizing systems is influenced by the following factors: temperature within the system, water content, composition of the mixture, flow profile, shear rate and residence time.

The mixing apparatuses used in the emulsifying device system and according to the invention are equipped with stirrer units that guarantee a lamellar flow that guarantees droplet breakup under laminar elongation conditions. According to an advantageous embodiment of the invention, at least one constituent of the stirrer element is arranged spaced apart and parallel to the inner wall of the chamber.

Preferred stirrer units are full-blade or part-blade stirrers or full-wire or part-wire stirrers or a combination of these.

The droplet breakup under laminar elongation conditions advantageously leads to an extremely small particle size distribution around a mean droplet diameter in the emulsion produced. Very often, the graph of the particle size distribution has a shape very similar to a Gaussian curve. The particle sizes that are achievable using the apparatus according to the invention are, depending on composition of the emulsion and/or dispersion, in the range from 50 to 20 000 nm.

The diameter of the stirrer unit $d_S$ based on the internal diameter of the chamber $d_k$ is preferably in the range from 0.99 to 0.6×$d_k$. The stirrer unit, however, is at least 0.5 mm removed from the chamber wall. Preferably, the diameter of the stirrer unit is from 0.6 to 0.7×$d_k$, particularly preferably from 0.99 to 0.8×$d_k$.

The diameter of the stirrer shaft $d_{SS}$ based on the internal diameter of the chamber $d_k$ is preferably in the range 0.25-0.75×$d_k$, particularly preferably in the range from 0.3-0.7×$d_k$, in particular in the range from 0.4-0.6×$d_k$.

This unusually large diameter of the stirrer shaft with respect to the chamber diameter furthermore results in the distance between stirrer shaft and chamber wall—also designated by the person skilled in the art as the "flow diameter"—always being so small that no thrombi-like flow can form and a laminar flow is guaranteed.

The wire stirrers that can be employed in the apparatus according to the invention are distinguished in that wires are attached to the stirrer shaft. It has surprisingly turned out that with these very good mixing results and a minimized energy consumption are achieved if these are bent in the manner of a horseshoe or of a rectangle with rounded corners and are connected to the stirrer shaft by their ends.

The arrangement on the shaft can also be different, depending on the product to be mixed. One or more horseshoe-shaped or rectangularly bent wires can be arranged on the stirrer shaft. Either a full-wire stirrer or a part-wire stirrer can be employed here.

The full-wire stirrer (FIG. 3 C) is characterized in that it consists of at least two wires that are horseshoe-shaped or bent into the shape of a rounded rectangle, which relative to the shaft are attached opposite one another to the shaft and are connected to the shaft in the upper and lower area of the shaft. The wires here are preferably tilted and/or rotated perpendicular to the middle axis and/or are at an angle of 0° to 90°, preferably from 0° to 45°, particularly preferably from 0° to 25°, to the left or right, based on the axis of rotation. The upper and lower lengths of the wires can have identical or different lengths. As many wires as desired can be arranged on the circumference of the shaft. Further wires or any desired geometric shapes can be situated in the resulting hollow space between shaft and wire.

A wire diameter is preferred which maximally lies in the range of the shaft diameter and minimally does not fall below 0.2 mm, a wire diameter of at most 15% of the shaft diameter and minimally 0.5 mm is particularly preferred, in particular the range from 10% of the shaft diameter and minimally 1% of the shaft diameter.

The part-wire stirrer (FIG. 3 D) is characterized in that it consists of at least two U- or horseshoe-shaped bent wires, the ends of which are connected to the shaft at any desired height. The wires here are preferably perpendicular to the middle axis and/or are tilted and/or rotated at an angle of 0° to 90°, preferably from 0° to 45°, particularly preferably of 0° to 25°, to the left or right based on the axis of rotation. The upper and lower lengths of the wires extending radially from the stirrer shaft can have identical or different lengths. As many wires as desired can be arranged on the circumference of the shaft. Further wires or any desired geometric shapes can be situated in the resulting hollow space between shaft and wire.

A wire diameter is preferred that maximally is in the range of the shaft diameter and minimally does not fall below 0.2 mm, a wire diameter of maximally 15% of the shaft diameter and minimally 0.5 mm is particularly preferred, in particular the range from 10% of the shaft diameter and at least 1% of the shaft diameter.

As a result of the favorable ratio of the diameter of the chamber to the diameter of the stirrer shaft in combination with the advantageous wire stirrers, a particularly effective torque utilization is guaranteed, that minimizes the force which the stirrer unit exerts on the components to be mixed, such that good mixing is achieved with, at the same time, minimized energy consumption of the motor.

Furthermore, the unusually large shaft diameter with respect to the chamber diameter makes it possible that the stirrer shaft itself can be utilized for product temperature control.

In addition, full-blade stirrers and part-blade stirrers have turned out to be particularly suitable.

The full-blade stirrer (FIG. 3 A) is characterized in that it consists of at least two square, rectangular, horseshoe-shaped or trapezoidal metal sheets, wherein the corners of the metal sheets are rounded off to prevent the production of turbulent flows, wherein one side is connected to the shaft, and the metal sheets reach uninterruptedly from the upper area of the shaft to the lower area of the shaft. The metal sheets in this connection are preferably perpendicular to the middle axis and/or are inclined and/or rotated at an angle of 0° to 90°, preferably from 0° to 45°, particularly preferably from 0° to 25°, to the left or right of the middle axis. The upper and lower edges of the metal sheets can have identical or different lengths. As many metal sheets as desired can be arranged on the circumference of the shaft. The individual blades can be provided with further geometric passages, such as bores or die-cuts.

The part-blade stirrer (FIG. 3 B) is characterized in that it consists of at least two square, rectangular, horseshoe-shaped or trapezoidal metal sheets, wherein one side is connected to the shaft at any desired height. The metal sheets in this connection are preferably perpendicular to the middle axis and/or are tilted and/or rotated at an angle of 0° to 90°, preferably of 0° to 45°, particularly preferably of 0° to 25°, to the left or right of the middle axis. The upper and lower edges of the metal sheets can have identical or different lengths. As many metal sheets as desired can be arranged on the circumference of the shaft. The individual metal sheets can be provided with further geometric passages.

Further stirrer units known to the person skilled in the art and their special designs can be installed for the mixing of the product in the mixing apparatus, such as, for example, the designs anchor stirrer, dissolver disk, inter-MIG, etc. Likewise, it is possible to combine various stirrer designs with one another on one stirrer shaft.

The stirrer units used in the mixing apparatus according to the invention are furthermore distinguished in that each stirrer shaft is guided in a rotationally stable manner, to this end preferably in the upper and lower area of the mixing apparatus. Imbalances in the stirrer unit at high speeds are thus intended to be ruled out or avoided to the greatest possible extent, so that turbulence which affects or even prevents the buildup of the necessary laminar flow cannot be generated. Ball bearings, linear ball bearings, plain bearings, linear plain bearings or the like, for example, can be used for guiding the shaft. The shaft is advantageously balanced for further rotational stability.

The materials from which both the mixing apparatus itself and the above-mentioned stirrer designs, in particular the above-mentioned full-blade stirrers, part-blade stirrers, full-wire stirrers and part-wire stirrers are manufactured are suited to the chemical properties of the components to be emulsified and the resulting emulsions. Preferably, the stirrer units in the mixing apparatus according to the invention comprise steels, such as, for example, stainless steels, but also construction steels, plastics, such as, for example, PEEK, PTFE, PVC or plexiglass or compound materials or combinations of steel and plastic.

The mixing apparatuses are conceived such that they spontaneously oppose only a small counter pressure from the components to be emulsified. It is achieved by means of the specially bent wire stirrers that even during the mixing process only a minimal pressure buildup results. For this reason, the mixing apparatus can essentially be designated a pressureless/low-pressure system.

To achieve this, the cross-section of the outlet line must be chosen such that the total amount of product of the mixed components can flow off unhindered. In this connection, especially in the mixing apparatus 1, the extreme viscosity increase is to be observed, which results in the buildup of the highly viscous lyotropic liquid-crystalline gel phase. In the dimensioning of further process technology components, such as, for example, pipelines, heat exchangers etc., care is to be taken that these are only oppose minimal pressure decreases to the entire system in order to guarantee a continuous low-pressure system. Depending on product and apparatus configuration, pressure decreases of below 0.5 bar can be realized in the entire system.

In the emulsifying device according to the invention, temperature control of the mixing apparatus and the inlet and outlet lines is advantageously particularly simply and effectively realizable. On account of the small volumes and the large ratio of surface to volume of the chamber in the mixing apparatus caused by the shape of the chamber, a better controlled temperature management of the product can be guaranteed in the apparatus according to the invention in comparison to conventional emulsifying devices.

For heating the mixing apparatuses, a double jacket is particularly suitable. This can be heated with gases, such as, for example, steam, or with liquids, such as, for example, water or thermal oil. Further possibilities are, for example, electrical heating such as heating wires, heating cables or heating cartridges.

For the temperature control of the components to be emulsified in the chamber and in the inlet and outlet lines, both passive heat exchange processes, such as, for example, cooling ribs, active processes, such as, for example, tube bundle heat exchangers, and also combinations of both methods can be employed to guarantee temperature control as uniform and rapid as possible.

For the temperature control of the components to be emulsified from outside to inside, the mixing apparatus is preferably equipped with a double jacket, full- or half-tube cooling coils, which are attached outside and/or inside the mixing apparatus and are fed with a cooling/heating medium, e.g. by means of a thermostat.

Preferably, the temperature control is improved by additional baffles in the interior of the double jacket. By means of the optimization of the ratio of diameter to the distance between inlet and outlet line, it is additionally possible to adjust the flow rate of the mixed material such that an optimal temperature exchange is afforded.

The device according to the invention is distinguished in contrast to conventional batch processes in that basically not all components of the recipe have to be heated, but that only those components that are not sufficiently fluid at room temperature are heated until they are fluid. The embodiment of the mixing apparatuses according to the invention, in particular the length/diameter ratio, is advantageous for the heat control, such that the energy dissipated by stirring can be utilized in controlled heat supply.

In a further embodiment, the mixing apparatus according to the invention is equipped with baffles, which promote a lamellar flow of the components.

According to an advantageous embodiment, the baffles and/or the stirrer unit can be temperature controlled and thus make possible temperature control of the mixture.

Preferably, the at least one mixing apparatus comprises a rotationally symmetric chamber, in which the components to be emulsified are converted to a lyotropic liquid-crystalline phase by passing through a turbulent and a percolating area.

In a further embodiment of the invention, the at least one mixing apparatus comprises a plurality of rotationally symmetric chambers connected in series. It is thus made possible that, if for construction reasons the height of the at least one mixing apparatus is restricted, the mixing process can be divided in a number of successive chambers. The components here do not pass through the three different areas, turbulence area, percolating area and laminar area within a single chamber, but within a number of chambers.

The emulsifying device according to the invention in the simplest case comprises the at least one mixing apparatus corresponding to the aforementioned description.

Customarily, an emulsifying device according to the invention, however, comprises at least two mixing apparatuses, which are connected in series one behind the other and into which various components are fed and mixed with one another in succession or simultaneously. Here, the viscosity of the mixture produced in the first mixing apparatus is always greater than or equal to the viscosity in the following mixing apparatus(es). At least the first mixing apparatus must here correspond in construction and function to the at least one mixing apparatus, i.e. in the first mixing apparatus the particular flow control must be guaranteed, in which the components are first mixed turbulently and then achieve a lyotropic liquid-crystalline state by means of passing through a percolating area.

In the production of conventional two-phase systems such as WO emulsions, but also OW emulsions without a gel network phase, in the emulsifying device according to the invention the ratio of internal (disperse) phase and external (continuous) phase in the first mixing apparatus is always greater than in the following mixing apparatus(es).

In the emulsifying device according to the invention, it is further possible that a number of mixing apparatuses can be connected not only in series one behind the other, but also serially above or under one another. Here, the individual mixing apparatuses can also be accommodated together in a housing, such that the separation of the mixing apparatuses is not visible from outside.

In the further course of the production of the said products in the emulsifying device according to the invention, the highly viscous content of the first mixing apparatus is led into the following mixing apparatus(es). Here, the supply in the following mixing apparatuses is arranged such that the height of the entry lines preferably takes place in the lower third, preferably in the lower quarter, based on the height of the mixing apparatus.

In the mixing apparatuses connected downstream of the first mixing apparatus, it is no longer necessary that the internal phase predominates in proportion to the continuous phase. In one embodiment of the emulsifying device according to the invention, in a first mixing apparatus the components to be emulsified are converted to a laminar liquid-crystalline phase and in a second mixing apparatus diluted to the desired concentration by the addition of external phase.

The emulsifying device according to the invention also comprises appropriate peripherals, such as storage containers for at least 2 components connecting lines for the supply of the components to the at least one mixing apparatus, associated pumps and valves, connecting lines for the removal of components, control device for monitoring and regulation of the process stages, a display device with an operating part for the visualization and input of process variables.

Mixing apparatuses and connecting lines are temperature-controllable.

Mixing apparatus and connecting lines can have sensors for product and process control.

Furthermore, the outlet lines of the individual mixing apparatuses can have further sensors, that make possible, for example, a continuous particle size measurement, directly or in a bypass, a temperature measurement, a pressure measurement, a conductivity measurement, a viscosity measurement, or the like.

The product quality of the final product is preferentially determined in the device according to the invention in the first stirring stage.

Furthermore, in the inlet and outlet line of the mixing apparatuses according to the invention or in a number of mixing apparatuses, a heat exchanger can be attached between the mixing apparatuses of a system according to the invention. It has been shown that here the introduction of tube bundle heat exchangers in combination with perforated baffles in the product stream and baffles in the heating and cooling circuit is very effective. As a result of the comparatively small product amounts, advantageously a very compact and efficient construction of the heat exchangers is possible. These heat exchangers can be employed both in the serial method of construction and in the method of construction connected in series. The introduction of other heat exchanger construction forms, such as, for example, cooling coils, tube bundle heat exchangers, double tube heat exchangers, ribbed tube heat exchangers, spiral belt heat exchangers, plate heat exchangers, store heat exchangers and other special designs, is likewise possible.

As a cooling medium, both gases, such as, for example, nitrogen, and also liquids, such as, for example, water or thermal oil, can be employed.

Using the above-mentioned heat exchangers, it is likewise possible to cool and also to heat. Here too, a suitable heating/cooling for the desired product can be chosen by the person skilled in the art.

Depending on the use of the emulsifying device, a combination of heating and cooling units is optionally also possible. This can also be simply and efficiently solved as described above by use of a double jacket, a heating/cooling coil or an appropriate heat exchanger.

In smaller emulsifying devices, particularly suitable for this are heating/cooling baths (thermostats), which preferably are monitored and operated by an overriding control. Additionally, a stand-alone operation can also be made possible using these thermostats. Since the thermostats as a rule also have the possibility of attaching an external temperature sensor, this can be introduced into the product flow. The thermostat then independently controls the heating or cooling capacity needed and thus provides for an optimum product temperature. A further advantage of this method is a release of the control, since this can leave the regulation of the temperature of the mixing apparatuses to the thermostat.

By means of optimization of the temperature of the component supply in the mixing apparatuses, optimization of the product temperature can likewise be achieved. In this connection, the inlet path of the components from the storage container to the entry into the mixing apparatus can also be optimized and utilized to the extent that component streams arrive in the mixing apparatus at an optimal temperature for the components to be emulsified.

An emulsifying device according to the invention comprises

- at least one mixing apparatus according to the invention
- at least one motor for the stirrer units of the mixing apparatus,
- at least two storage vessels for the phases to be emulsified, which are connected to the mixing apparatus by means of the inlet lines, and from which the components are fed air-free into the mixing apparatus by means of conveying devices,
- at least one conveying device per component or per component mixture,
- optionally input stream monitoring sensors and/or output flow monitoring sensors, with which an automatic quality control can optionally be carried out simultaneously,
- optionally at least one device for temperature control for the emulsifying device and the line system for supply and removal of the components and component mixtures,
- a control device for the monitoring and control of the mixing apparatuses, the supply and removal of the components and component mixtures,
- optionally a display device having an operating panel for visualization and for the input of data.

Customarily, the emulsifying device, however, comprises at least two mixing apparatuses, which are connected one after the other and in which various components are mixed with one another successively. Here, the viscosity of the mixture produced in the first mixing apparatus is always greater than or equal to the viscosity in the following mixing apparatus(es). At least the first mixing apparatus must correspond here in construction and function to the at least one mixing apparatus, i.e. in the first mixing apparatus the particular flow management must be guaranteed, in which the components are firstly mixed turbulently and then achieve a lyotropic liquid-crystalline state by means of passage through a percolating area.

In the production of conventional two-phase systems such as WO emulsions, but also OW emulsions without a gel network phase, in the emulsifying device according to the invention the ratio of internal (disperse) phase and external (continuous) phase in the first mixing apparatus is always greater than in the subsequent mixing apparatus(es).

The entire system according to the invention is controlled by means of a memory-programmable control. This monitors, for example, the numbers of revolutions of the mixing apparatuses, the inflow of the individual components, the numbers of revolutions of the pumps, the temperatures and pressures of the individual phases added and all other parameters necessary for the operation. It can in connection with mass or volume flow meters monitor and control the inflow of the individual components into the respective mixing apparatuses. It can transmit previously defined warnings and disorders by means of an optical or acoustic output apparatus. Optical and visual output can be located separately here from the apparatus according to the invention such as, for example, in a control center.

Alternative control possibilities, such as, for example, SPS software or PC control, are likewise possible as a combination of several control possibilities.

By means of a remote maintenance module for the connection of an analog telephone line or an ISDN line, integrated with the control device or attached to this, the access to a mobile radio network or a LAN or WLAN network, it is possible to perform a remote maintenance of the apparatus according to the invention or alternatively to send warning and error messages or to control the entire system according to invention.

Furthermore, the control can have a recipe module, in which one or more recipes for various products are deposited. Each recipe can in this connection consist of a number of datasets. In the datasets, the parameters necessary for operation such as, for example, the number of rotations, the ratio of the volume flows etc., are held. After calling up of the recipe, the datasets are executed either time-controlled, or after triggering of a certain event, e.g. the reaching of a certain temperature. This makes possible the guarantee that products can be produced with always the same quality.

Figure 3:
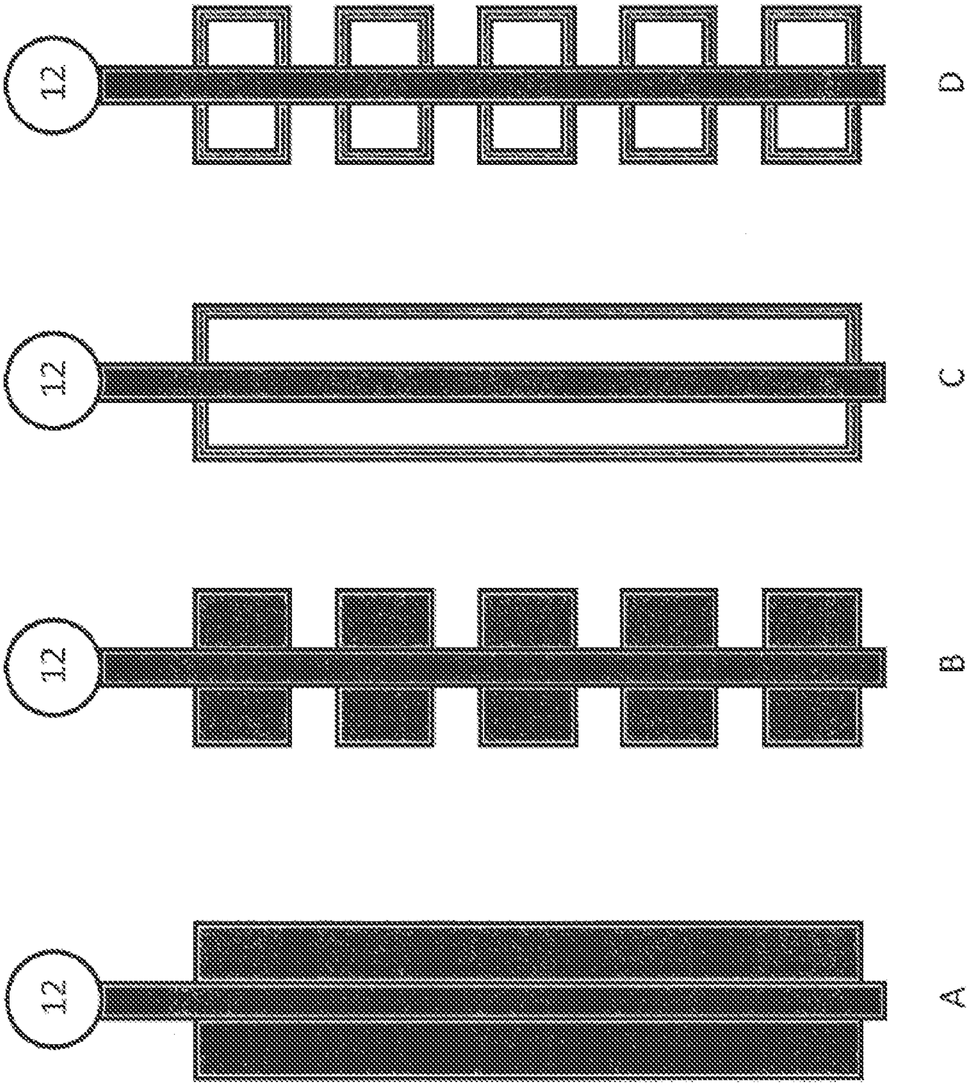

The invention is illustrated more closely with the aid of the following figures and working examples, without restricting it. These show FIG. 1 Emulsifying device containing a mixing apparatus FIG. 2 Various mixing apparatus geometries FIG. 3 Various stirrer units FIG. 4 Emulsifying device containing a mixing apparatus with a further supply line in the percolating area FIG. 5 Emulsifying device containing two mixing apparatuses FIG. 6 Emulsifying device containing two mixing apparatuses and a heat exchanger FIG. 7 System scheme FIG. 8 Energy diagram FIG. 1 shows in sectional representation an emulsifying device containing a mixing apparatus 1 having a rotationally symmetric chamber 2 sealed on all sides in the form of a hollow cylinder. Into the chamber projects a stirrer shaft 10, on which are arranged the stirrer wires 11, as shown in FIG. 3 D. The stirrer shaft 10 is driven by the motor 12 and guided by the bearings and seals 8. Furthermore, the stirrer shaft 10 is additionally guided in the bearing 9 in the bottom part of the chamber 2. The chamber 2 has inlet lines 5 or 6 in the lower part for the air-free supply of the components A and B to be emulsified. In the upper part of the chamber 2 is arranged the outlet line 7. Inlet and outlet lines are likewise temperature controlled and have corresponding supply pumps (not shown in FIG. 1).

The ratio between the distance between inlet lines 5 and 6 and outlet line 7 and the diameter of the chamber 2 is approximately 3.5.

The ratio between the distance between inlet lines 5 and 6 and outlet line 7 and the length of the stirrer arms of the wire stirrers is approximately 15:1.

The chamber 2 is surrounded by a thermostat jacket 3, which in combination with the thermostat 4 allows temperature control of the mix. On account of the greater distance between inlet and outlet compared to the chamber diameter, the mix can be heated in a controlled manner such that the energy input caused by the stirrer does not destabilize the mix.

The emulsifying device according to FIG. 1 can be utilized as follows, for example, for the dilution of 100 kg per hour of sodium lauryl ether sulfate (SLES):

By means of the pump of phase A, 41.4 kg per hour of 70% SLES is led continuously via the inlet line 5 and by means of the pump of phase B 58.6 kg per hour of water is led continuously via the inlet line 6 into the mixing apparatus 1 and mixed at 3000 revolutions per min.

The mixing apparatus 1 is sealed on all sides and is operated with exclusion of air. The components A and B to be mixed are introduced into the chamber 2 of the mixing apparatus 1 as flowable streams, mixed by means of the stirrer unit 10 containing the stirrer wires 11 until the mixed components reach the outlet line 7 and are led off such that no air penetrates into the chamber 2 of the mixing apparatus 1.

On putting the mixing apparatus into operation, the air contained therein is completely displaced within a short time by the entering components A and B, whereby the application of a vacuum is advantageously unnecessary.

The mixed components A and B pass through the chamber 2 of the mixing apparatus 1 gradually beginning from the inlet 5, 6 to the outlet 7. The components A and B introduced into the chamber 2 via the inlet lines 5, 6 firstly migrate through an inlet-side turbulent mixing area, in which they are turbulently mixed by the shear forces exerted by the stirrer wires 11. In a percolating mixing area connected above it, the components are mixed further, the turbulent flow decreasing and the viscosity increasing until a lyotropic, lamellar liquid-crystalline phase establishes in an outlet-side laminar mixing area. The temperature of the mixture is kept constant by means of the thermostat jacket 3.

28% strength SLES is obtained at the exit of the stirring stage.

Figure 4:
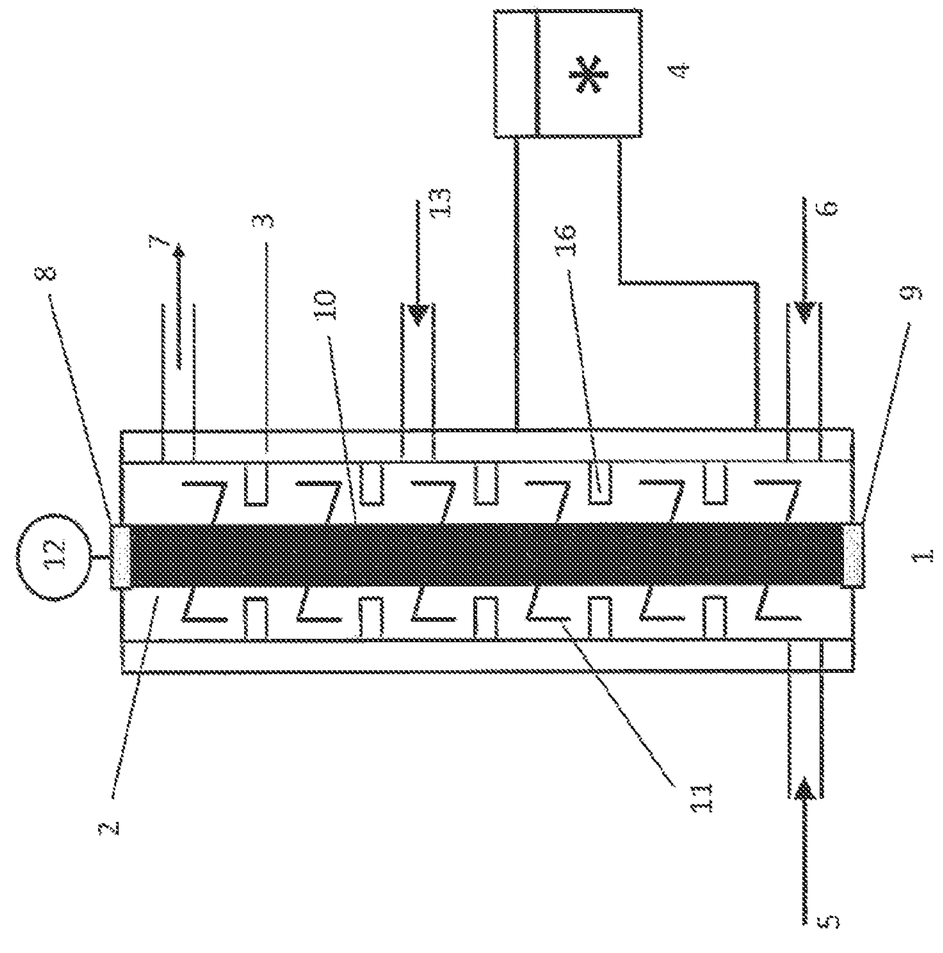

FIG. 4 shows in sectional representation a single-stage emulsifying device, which is constructed and dimensioned analogously to FIG. 1, but has a further inlet line 13 for a component C. Inlet and outlet lines are temperature-controlled and are operatively connected to pumps (not shown in FIG. 4).

The emulsifying device according to FIG. 4 can be utilized as follows for the production of a simple O/W spray.

Component A: aqueous emulsifier phase
Component B: oil phase
Component C: water phase Component A is continuously introduced air-free at 8.1 kg per hour via the inlet line 5 and component B at 22.5 kg per hour via the inlet line 6 into chamber 2 of the mixing apparatus 1 and mixed at approximately 3000 revolutions per min. The components A and B are mixed by means of the stirrer unit 10 with the stirrer wires 11. After the mixture has passed through approximately 60% of the chamber length, the component C is metered into the mixing chamber at 69.4 kg per hour via the inlet line 13 and mixed until the mixed components reach the outlet line 7. On putting into operation the mixing apparatus 1, the air contained therein is completely displaced by the entering components within a short time, whereby the application of a vacuum is advantageously unnecessary.

The mixed components A and B pass through the mixing apparatus 1 gradually beginning from the inlet 5, 6 to the outlet 7. The components A and B introduced via the inlet lines 5, 6 into the chamber 2 firstly pass through an inlet-side turbulent mixing area, in which they are mixed turbulently by the shear forces exerted by the stirrer wires 11. In a percolating mixing area connected above it, the components A and B are further mixed, the turbulent flow decreasing and the viscosity increasing until a lyotropic, liquid-crystalline phase establishes in an outlet-side laminar mixing area and in which the component C is supplied via the inlet line 13. The temperature of the mixture is kept constant by means of the thermostat jacket 3.

Figure 5:
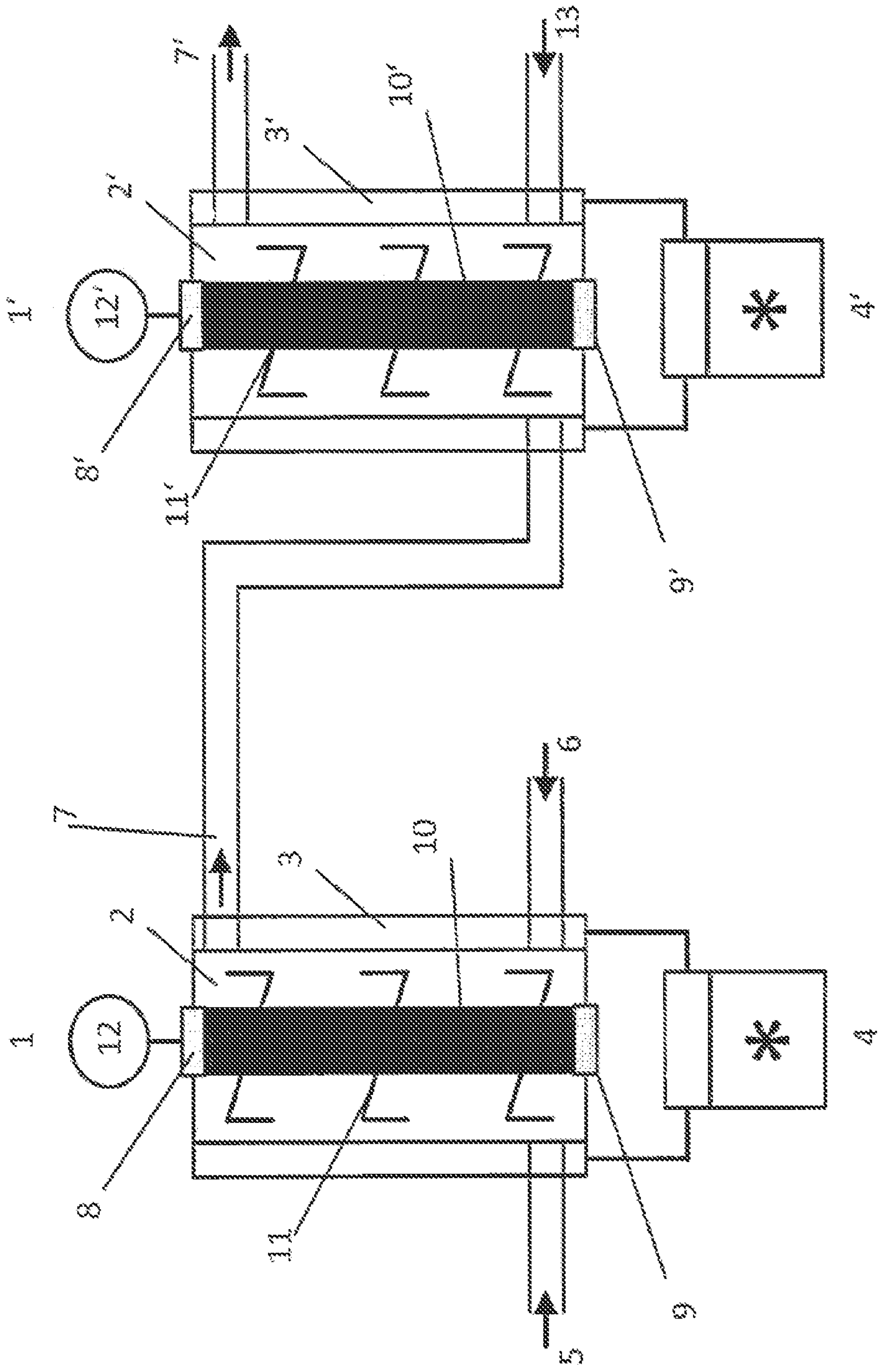

FIG. 5 shows in sectional representation an emulsifying device containing two mixing apparatuses 1 and 1'.

The emulsifying device according to FIG. 5 is distinguished in that it consists of two mixing apparatuses 1 and 1' connected in series, the outlet line 7 of the first mixing apparatus 1 being connected with the inlet line of the following mixing apparatus 1'. Each mixing apparatus 1 and 1' has a thermostat jacket 3 or 3' and can be individually temperature controlled, if desired, by means of the thermostat 4 or 4'. Stirrer elements are wire stirrers fixed to the stirrer shaft according to the representation of FIG. 3 D.

The ratio between the distance between inlet lines 5 and 6 and outlet line 7 and the diameter of the chamber 2 of the mixing apparatus 1 is approximately 2.0.

The ratio between the distance between inlet lines 5 and 6 and outlet line 7 and the length of the stirrer arms of the wire stirrers is 8:1.

Chamber 2' of the mixing apparatus 1' corresponds in construction and dimensioning to the chamber 2 of the mixing apparatus 1.

The mixing apparatuses 1 and 1' are equipped with sensors for viscosity, pressure and temperature (not shown here). The mixing apparatuses 1 and 1' are sealed on all sides.

The emulsifying device according to FIG. 5 can be utilized as follows for the production of a simple OW emulsion (120 kg per hour).

Component A: emulsifier with additional base for neutralization of the thickener
Component B: oil phase
Component C: water phase with thickener Component A is continuously introduced at 5.65 kg per hour via the inlet line 5 and component B at 21.93 kg per hour via the inlet line 6 into chamber 2 of the mixing apparatus 1 and mixed at approximately 3000 revolutions per min. The components A and B are mixed by means of the stirrer unit 10 with the stirrer wires 11 until the mixed components reach the outlet line 7 and are led off into the chamber 2' of the mixing apparatus 1' such that no air penetrates into the chamber 2 of the mixing apparatus 1. On putting into operation the mixing apparatus 1 and 1', the air contained therein is completely displaced by the entering components within a short time, whereby the application of a vacuum is advantageously unnecessary.

The mixed components A and B pass through the mixing apparatus 1 gradually beginning from the inlet 5, 6 to the outlet 7. The components A and B introduced via the inlet lines 5, 6 into the chamber 2 firstly pass through an inlet-side turbulent mixing area, in which they are mixed turbulently by the shear forces exerted by the stirrer wires 11. In a percolating mixing area connected above it, the components A and B are further mixed, the turbulent flow decreasing and the viscosity increasing until a lyotropic, lamellar liquid-crystalline phase establishes in an outlet-side laminar mixing area. The temperature of the mixture is kept constant by means of the thermostat jacket 3.

Phase C is introduced into the chamber 2' at 72.42 kg per hour together with the highly viscous mixture of the components A and B via the inlet line 13. By means of stirrer unit 10 and stirrer wires 11, the components are mixed until they reach the outlet line 7' and are led off such that no air penetrates into the chamber 2'.

In the chamber 2', the highly viscous mixture of the components A and B is diluted with the water phase of the component C to give a flowable emulsion having a particle size of 400 nm and a viscosity of 15 000 m Pas. The thickener there serves for emulsion stabilization and influences the skin sensation positively.

Figure 6:
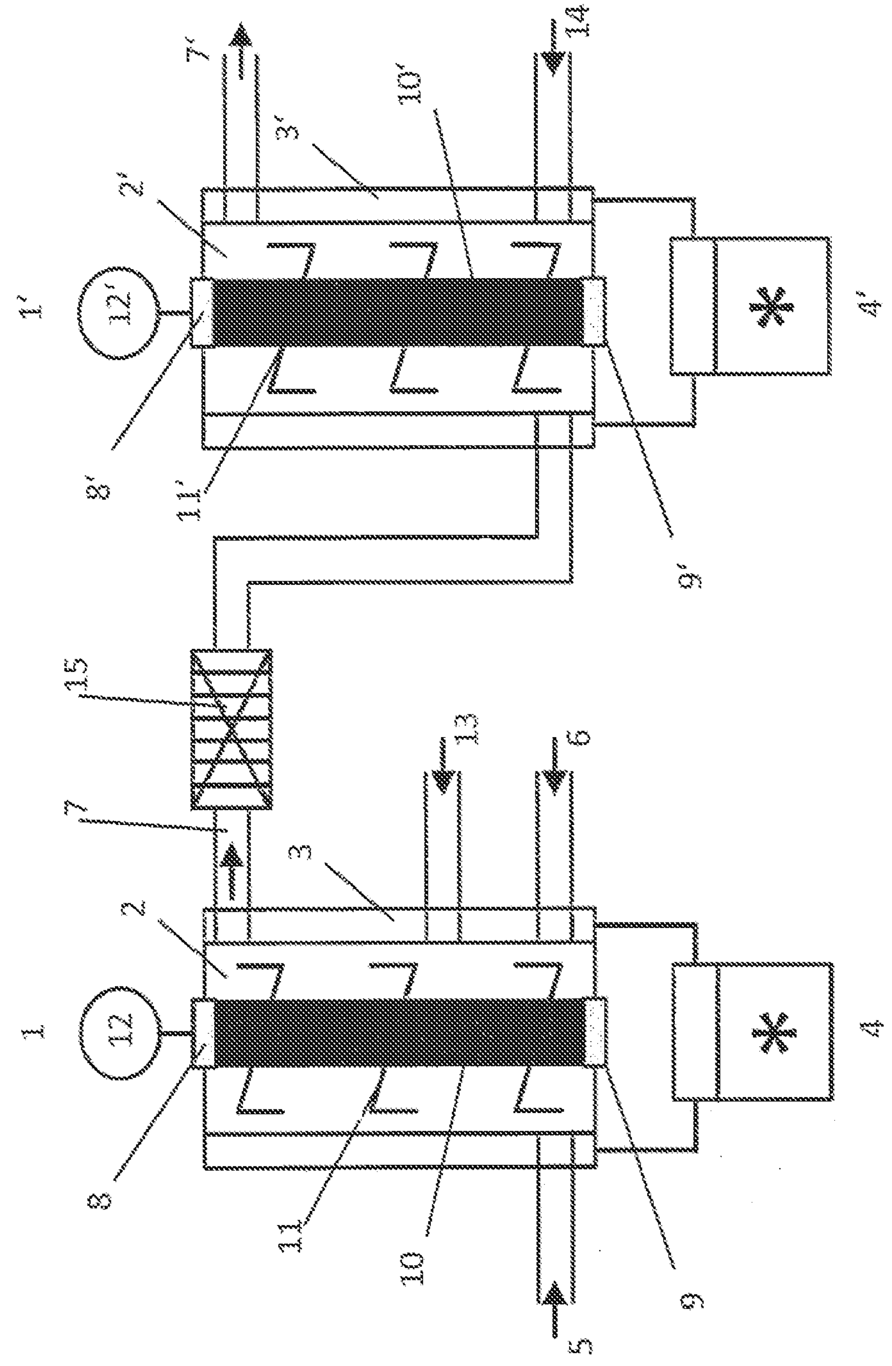

FIG. 6 shows in sectional representation an emulsifying device containing two mixing apparatuses 1 and 1' and an intermediately connected plate heat exchanger 15. The emulsifying device according to FIG. 6 is constructed and dimensioned analogously to the emulsifying device according to FIG. 5. The additional inlet line 13 for the component C and the plate heat exchanger 15 in the outlet line 7 to the inlet into chamber 2 is different.

The emulsifying device according to FIG. 6 can be used as follows for the production of a pearlescent agent (100 kg per hour).

| Component | Component | Vessel temperature | Throughput |
|---|---|---|---|
| A | SLES | room temperature (RT) | 22 kg per hour |
| B | glycol distearate | 70° C. | 24 kg per hour |
| C | water, betaine (co-surfactant) | RT | 21 kg per hour |
| D | water and preservative | RT | 33 kg per hour |

| | |
|---|---|
| Temperature strand phase A: | RT |
| Temperature strand phase B: | 80° C. |
| Temperature strand phase C: | RT |
| Temperature strand phase D: | RT |

| | |
|---|---|
| Temperature stirring stage 1 | 65° C. |
| Temperature stirring stage 2: | 5° C. |
| Temperature heat exchanger: | 40° C. |

| | |
|---|---|
| Stirring stage 1: | 3000 rpm |
| Stirring stage 2: | 3000 rpm |

Component A is introduced at 22 kg per hour and at room temperature continuously via the inlet line 5 and component B is introduced at 24 kg per hour at a temperature of 80° C. via the inlet line 6 into the chamber 2 of the mixing apparatus 1 and mixed at approximately 3000 revolutions per min. The inlet line 6 is temperature controlled such that component B is heated and is led into the chamber 2 at a temperature of 80° C.

When the components A and B mixed by means of the stirrer unit 10 with the stirrer wires 11 reach the area of the inlet line 13, the component C is fed into the mixture at 21 kg per hour and a temperature of 65° C. via the inlet line 13. The thermostat jacket 3 of the chamber 2' is temperature controlled at 65° C. by means of the thermostat 4 such that the components A, B and C are mixed at 65° C.

After feeding in component C, the mixture passes over to a percolating area until it reaches a lyotropic, liquid-crystalline state in the area of the outlet line 7.

Before the lyotropic, liquid-crystalline mixture removed via outlet line 7 is supplied to the chamber 2', this mixture is cooled to 40° C. by means of the plate heat exchanger 15 connected in the line 7'. This is necessary, since the liquid-crystalline precursor, which is prepared in the mixing apparatus 1, is temperature-sensitive. The liquid-crystalline precursor is then diluted with the phase D in the second mixing apparatus 1' with counter cooling by the heating/cooling jacket at a temperature of 5° C. The product quality can only be achieved by maintaining this temperature profile. If dilution with the cold phase D was carried out above 40° C., the quality requirements on the product could not be fulfilled. If the product is cooled too deeply before diluting, a product is likewise obtained that does not meet the quality demands. This is owed to the fact that the liquid-crystalline precursor assumes different liquid-crystalline structures depending on the temperature, from which different end states are achieved on dilution.

Figure 7:
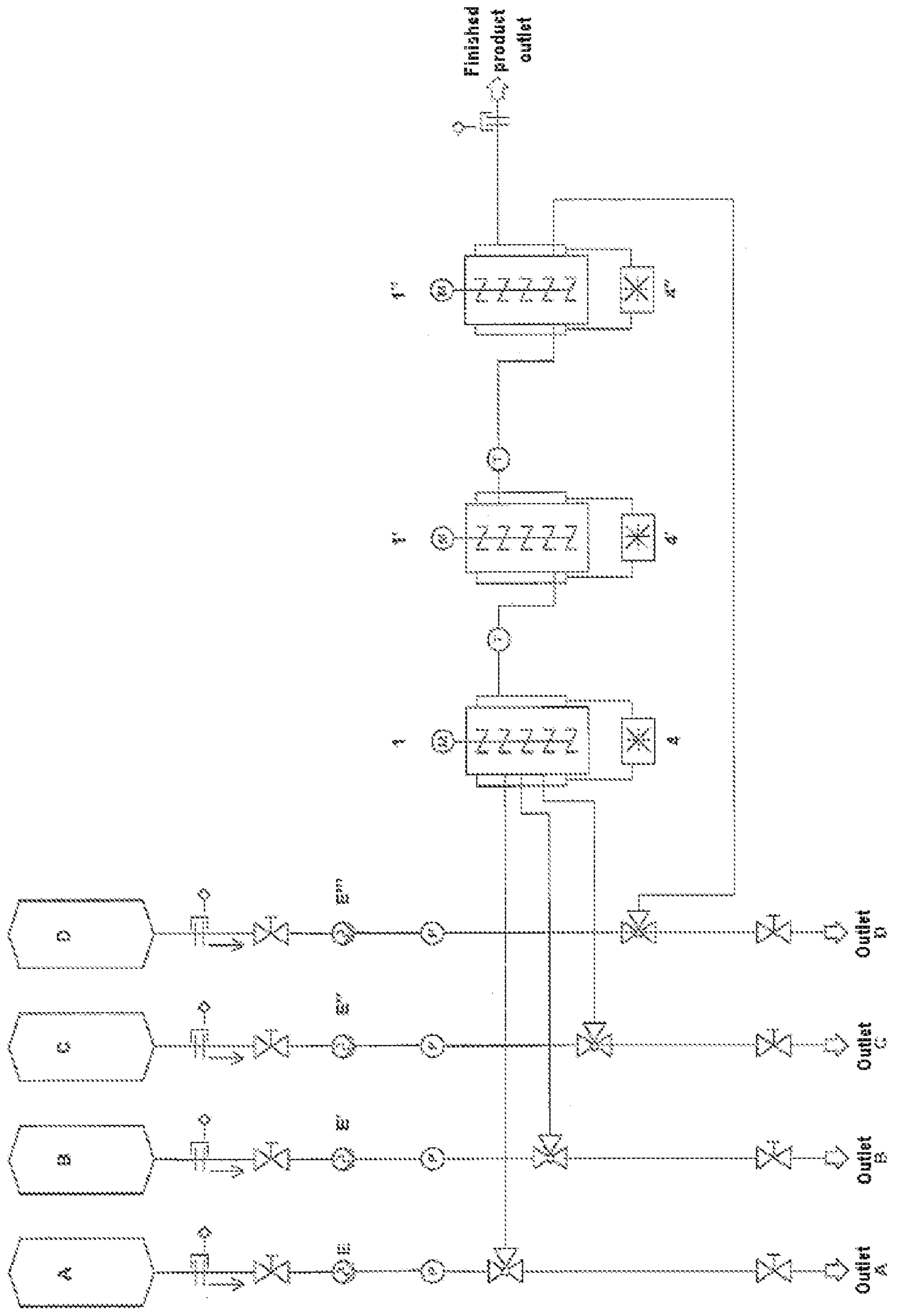

In FIG. 7, a scheme of a complete emulsifying system for the production of a shampoo is shown. The emulsifying system comprises 3 mixing apparatuses 1, 1' and 1", storage containers A to D for the components A to D to be mixed, connecting lines for the supply of the components A to D to the appropriate mixing apparatuses with associated pumps E, E', E", E"' and valves, connecting lines for the removal of components, thermostats 4, 4' and 4" for the temperature control of the mixing apparatuses 1, 1' and 1", a control device (not shown in FIG. 7), which monitors and regulates all process stages, a display device (not shown in FIG. 7) with an operating part for the visualization and input of process variables.

The connecting lines between the mixing apparatuses 1 and 1' and also 1' and 1" are equipped with temperature sensors T for the temperature control of the mixing chambers.

The mixing apparatuses and connecting lines have sensors for product and process control (not shown in FIG. 7).

Furthermore, the outlet lines of the individual mixing apparatuses can have further sensors, which, for example, make possible continuous particle size measurement, directly or in a bypass, a temperature measurement, a pressure measurement or the like.

The system according to FIG. 7 is explained with the aid of an emulsifying example for the production of a shampoo.

The following components are stored in the storage tanks:

component A: sodium laureth sulfate (SLES) 70% component B: water, preservative, co-surfactant component C: pearlescent agent component D: water, salt, colorants The three mixing apparatuses 1, 1', 1" which are in each case equipped with a thermostat jacket and have their own heating/cooling circuit form the core constituents. In the mixing apparatus 1, a highly viscous gel phase is produced from the individual components (component A, component B, component C). The mixing apparatus 1' serves for the subsequent stirring of the gel phase which then led to the mixing apparatus 1", to be diluted there with component D.

Component A, component B and component C are aspirated using eccentric spiral pumps E, E' and E" and supplied to the first mixing apparatus 1' in the ratio 1:3.71:0.36. The component D is supplied to the mixing apparatus 1" using the pump E'" in the ratio 2.21 based on component A. The pumps were selected such that they supply a uniform, non-pulsing component flow. Each pump must supply a minimal stable supply stream that is sufficient for a total production amount of 100 kg to 300 kg per hour. Eccentric spiral pumps are very highly suitable in the scheme shown, since they are uncritical with regard to changing viscosities.

On account of the fact that in the system shown schematically in FIG. 7, no flow meters for the individual product streams are present, advantageously a pump is to be chosen which has a linear transport characteristic line. Thus changing transport rates can be calculated simply. In systems with flow meters (volume or mass), nonlinear pumps such as, for example, gear wheel pumps can also be employed without problem.

The pumps E are designed for a counter pressure of up to 5 bar. By means of the exits component A to component D, the transport amount of the respective pump can be determined simply at a set speed of rotation. The determination of the transport amount at 100 rpm offers itself here. The corresponding transport stream is captured and weighed in a previously tared vessel for the period of 1 min. This process is repeated three times and the mean value is formed from all three transport streams. The transport stream of the pump thus averaged can then be converted by means of the three set to the desired transport stream needed for the recipe.

Using the speeds thus determined, the pumps and the motors of the stirrer units are now started. The pumps transport only the required amounts of the individual components to the mixing apparatuses in order to obtain the final product. By means of the built-in pressure sensors P, the resulting pressure can be controlled, and in the case of overpressure in the pipeline or the mixing apparatuses the control can react accordingly and emit a warning, stop the system, or take similar countermeasures. By means of the temperature sensors integrated into the outlet lines of the individual mixing apparatuses, the product temperature can be determined and utilized for controlling the temperature control equipment of the double jacket or otherwise processed in the control or a peripheral apparatus.

In the production of the shampoo, the total efficiency of the complete system was measured as a function of total flow.

Figure 8:
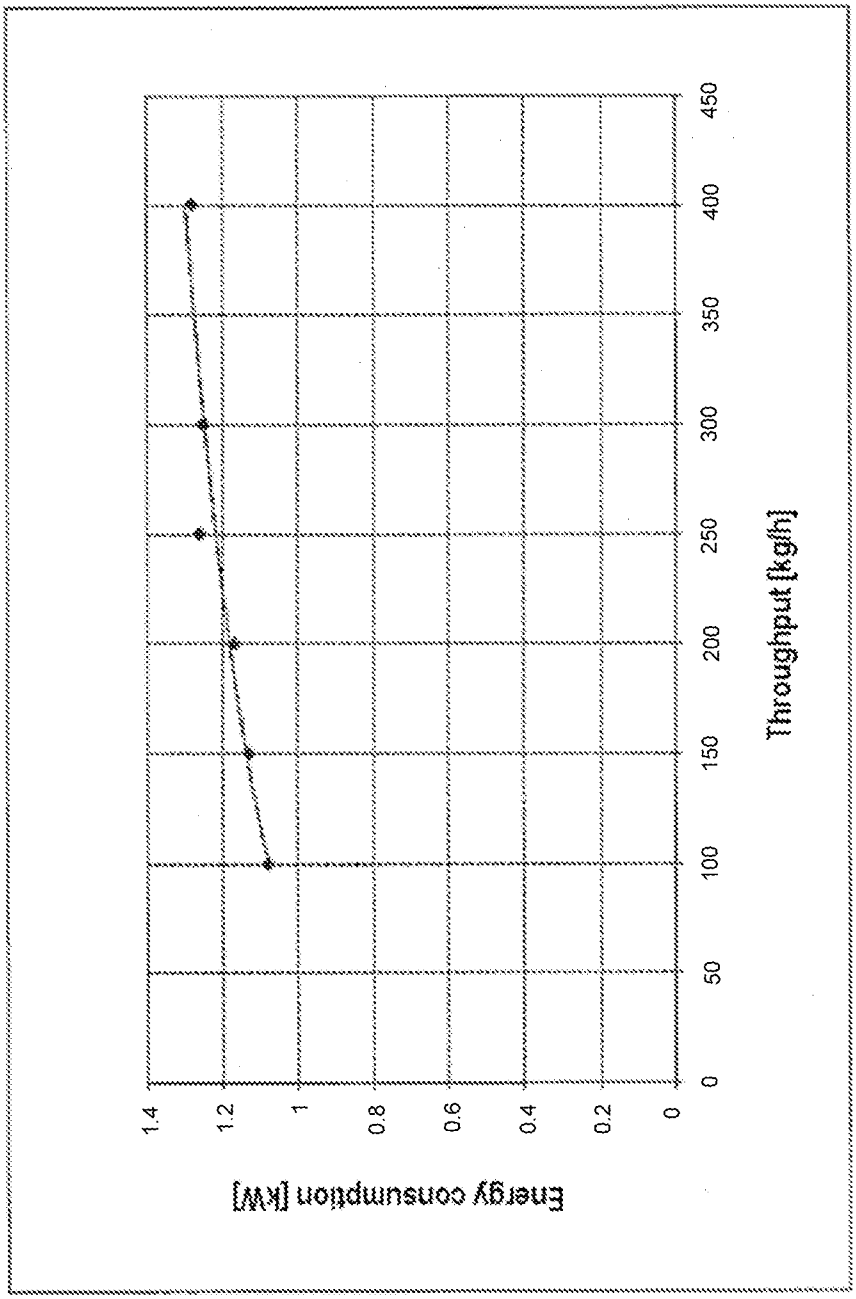

The total power consumption was measured at a throughput of 100 kg/hour, 150 kg/hour, 200 kg/hour, 250 kg/hour, 300 kg/hour and 400 kg/hour. The measurements determined were plotted in an XY graph (FIG. 8).

Conditions:

Emulsifying system having 3 mixing chambers

Chamber diameter: 50 mm

Stirring tool: part-wire stirrer

Measured values:

| Throughput [kg/h] | Energy consumption [kW] |
|---|---|
| 100 | 1.08 |
| 150 | 1.13 |
| 200 | 1.17 |

-continued

| Throughput [kg/h] | Energy consumption [kW] |
|---|---|
| 250 | 1.26 |
| 300 | 1.25 |
| 400 | 1.28 |

If the values are extrapolated with the aid of a statistics program, even with a throughput of 10 000 kg/h a total energy requirement of 2 kW is not exceeded.

The invention claimed is:

1. An emulsifying device for continuous production of emulsions and/or dispersions comprising a) at least one mixing apparatus comprising a rotationally symmetric chamber sealed airtight on all sides, at least one inlet line for introduction of free-flowing components, at least one outlet line for discharge of the mixed free-flowing components, a stirrer unit which ensures laminar flow and comprises stirrer elements secured on a stirrer shaft, the axis of rotation of which runs along the axis of symmetry of the chamber and the stirrer shaft of which is guided on at least one side, wherein the at least one inlet line is arranged upstream of or below the at least one outlet line, such that the components introduced into the mixing apparatus via the at least one inlet line are stirred and continuously transported by means of a turbulent mixing area on the inlet side, in which the components are mixed turbulently by the shear forces exerted by the stirrer elements, a downstream percolating mixing area in which the components are mixed further and the turbulent flow decreases, a laminar mixing area on the outlet side, in which a lyotropic, liquid-crystalline phase is established in the mixture of the components, in the direction of the outlet line, b) at least one drive for the stirrer unit and c) at least one conveying device per component or per component mixture.

2. The emulsifying device as claimed in claim 1, wherein the chamber has the shape of a hollow cylinder, of a frustocone, of a funnel, of a frustodome, or a shape composed on these geometric shapes, the diameter of the chamber remaining constant or decreasing from the inlet line to the outlet line and the stirrer unit being adapted correspondingly to the shape of the chamber.

3. The emulsifying device as claimed in claim 1, wherein the ratio between the diameter of the chamber and the distance between inlet and outlet lines is in the range from 1:50 to 1:2.

4. The emulsifying device as claimed in claim 1, wherein the ratio of the diameter of the stirrer shaft to the diameter of the chamber is 0.3 to 0.7.

5. The emulsifying device as claimed in claim 1, wherein at least one constituent of the stirrer elements is arranged in parallel and spaced apart from the inner wall of the chamber.

6. The emulsifying device as claimed in claim 1, wherein the stirrer unit is a full-blade or part-blade stirrer or a full-wire stirrer or a part-wire stirrer, or a combination of these.

7. The emulsifying device as claimed in claim 1, wherein the chamber has at least one baffle which promotes a laminar flow.

8. The emulsifying device as claimed in claim 1, wherein the at least one mixing apparatus has a plurality of rotationally symmetric chambers connected in series.

9. The emulsifying device as claimed in claim 1, wherein the mixing apparatus as the first mixing apparatus has at least one further mixing apparatus connected downstream, a lyotropic and liquid-crystalline phase being present in the mixture of the components downstream of the first mixing apparatus, and the viscosity of the mixture in the at least one further mixing apparatus downstream being equal to or less than the viscosity downstream of the first mixing apparatus.

10. The emulsifying device as claimed in claim 1, wherein at least one flow sensor is arranged in at least one of the lines.

11. The emulsifying device as claimed in claim 1, wherein at least one device for temperature control is coupled to at least one of the lines, such that the components, component mixtures and/or emulsions or dispersions are coolable or heatable.

12. The emulsifying device as claimed in claim 1, wherein the drive, the conveying device and a sensor, and the device for temperature control are connected to a control device for the monitoring and control of the mixing apparatuses, the supply and removal of the components, component mixtures, or emulsions or dispersions, the control device controlling the system such that the viscosity of the mixture obtained in the first mixing apparatus is always greater than or equal to the viscosity in the downstream mixing apparatus(es) and a laminar flow of the mixed components is ensured.

13. The emulsifying device as claimed in claim 12, wherein the control device is or can be connected to a remote maintenance module and/or a formula management module.

* * * * *